(12) United States Patent
Shetty et al.

(10) Patent No.: US 12,505,907 B2
(45) Date of Patent: Dec. 23, 2025

(54) SYSTEMS AND METHODS FOR INFUSION PUMP FORMULARY VALIDATION

(71) Applicant: CERNER INNOVATION, INC., North Kansas City, MO (US)

(72) Inventors: Rohith Shetty, Bangalore (IN); Amit Mudugal Jagadeesh, Bangalore (IN); Pavan Sindhigeri Karanam, Vasanthapura Bangalore (IN); Lakshmidas Mallya, Bangalore (IN)

(73) Assignee: CERNER INNOVATION, INC., Kansas City, MO (US)

( * ) Notice: Subject to any disclaimer, the term of this patent is extended or adjusted under 35 U.S.C. 154(b) by 512 days.

(21) Appl. No.: 17/993,393

(22) Filed: Nov. 23, 2022

(65) Prior Publication Data

US 2024/0170124 A1 May 23, 2024

(51) Int. Cl.
*G16H 20/17* (2018.01)
*G16H 40/67* (2018.01)

(52) U.S. Cl.
CPC .......... *G16H 20/17* (2018.01); *G16H 40/67* (2018.01)

(58) Field of Classification Search
None
See application file for complete search history.

(56) References Cited

U.S. PATENT DOCUMENTS

| | | | | |
|---|---|---|---|---|
| 5,943,633 | A * | 8/1999 | Wilson | A61M 5/142 702/45 |
| 6,078,273 | A * | 6/2000 | Hutchins | G01D 5/2451 341/11 |
| 7,997,474 | B2 * | 8/2011 | Zuhars | G16H 40/40 235/375 |
| 10,692,595 | B2 * | 6/2020 | Xavier | A61M 5/142 |
| 2007/0156089 | A1 * | 7/2007 | Yu | A61M 5/16827 604/131 |
| 2014/0112185 | A1 * | 4/2014 | Sims | H04L 63/0471 370/252 |
| 2014/0276569 | A1 * | 9/2014 | Kruse | A61M 5/14244 604/506 |
| 2017/0147761 | A1 * | 5/2017 | Moskal | G16H 20/17 |
| 2019/0328962 | A1 * | 10/2019 | Gaetano | G16H 40/63 |
| 2020/0027541 | A1 * | 1/2020 | Xavier | G16H 40/40 |
| 2020/0035346 | A1 * | 1/2020 | Xavier | G16C 20/62 |
| 2020/0035355 | A1 * | 1/2020 | Xavier | G06F 16/252 |

\* cited by examiner

Primary Examiner — Manuel A Mendez
(74) Attorney, Agent, or Firm — Kraguljac Law Group LLC

(57) ABSTRACT

Systems, executable process, and methods for validation of infusion pumps is described. A set of configuration files is loaded into a validation operational instruction generator. The configuration files may define the configuration of infusion pump operational instructions, the potential units of measure, the potential routes of administration, the potential dosages, and the formulary of potentially infusible materials. A set of operational instructions are generated for each combination of the potentially infusible materials for each potential route of administration for each potential dosage. The operational performance of an infusion pump is monitored during execution of the generated operational instructions.

20 Claims, 5 Drawing Sheets

SYSTEMS AND METHODS FOR INFUSION PUMP FORMULARY VALIDATION

BACKGROUND

Infusion pumps deliver medication, fluids, and nutrition to a patient, typically via an intravenous (IV) line, peripherally inserted central catheter (PICC) line or port-a-cath connected to a patient. Infusion pumps are often responsible for the critical delivery of the medications that may require high accuracy and precision. During its operational life, a care facility may use the same infusion pump during the care of a large number of patients, each with different demographic characteristics and reasons for treatment. However, traditional initial deployment of infusion pumps can be a complex series of validation and safety system testing phases to ensure that an infusion pump operates correctly when used to deliver the medication, fluids, and nutrition to a patient.

SUMMARY

Embodiments of the present disclosure relate to, among other things, methods, systems, and computer-readable media for computationally validating the operation and safety systems of an infusion pump prior to use in human (e.g., patient) care. Similarly, the embodiments described herein may be used for periodic revalidation or revalidation after a software update or maintenance of an infusion pump.

A first embodiment described is directed to a method for infusion pump validation. The method may include loading a set of configuration files into a validation generation algorithm, the set of configuration files. In some embodiments, the configuration files can define an infusion pump operational instruction configuration, unit of measure library, route of administration library, dosage library, subject library, and formulary libraries. The method further includes, generating a validation infusion pump operational instruction set for an infusion pump corresponding to the infusion pump operational instruction configuration for each combination of an entry in the formulary library and an entry from the subject library for each route of administration in the route of administration library that mirrors a route of administration in the formulary at each dose in the dosage library that mirrors a dosage in the formulary.

A second embodiment that is described is directed to non-transitory computer readable storage media. The computer readable storage media may store instructions that cause at least one processor to perform operations. The operations include loading a set of configuration files into a validation generation algorithm, the set of configuration files defining an infusion pump operational instruction configuration, unit of measure library, route of administration library, dosage library, subject library, and a formulary library. The operations also include generating a validation infusion pump operational instruction set for an infusion pump corresponding to the infusion pump operational instruction configuration for each combination of an entry in the formulary library and an entry from the subject library for each route of administration in the route of administration library that mirrors a route of administration in the formulary at each dose in the dosage library that mirrors a dosage in the formulary library. The validation infusion pump instructions are pushed to a first infusion pump that corresponds to a first entry in the one or more infusion pump operational instruction libraries, the first set of infusion pump instructions including each of the plurality of infusion pump operational instruction sets. The operations also include monitoring output signals of the first infusion pump during execution of the first set of infusion pump instructions by the first infusion pump and populating a validation file with the output signals of the first infusion pump.

A third embodiment that is described is directed to a system for infusion pump validation. The system can include at least one first infusion pump with operational instructions having a first configuration, at least one second infusion pump with operational instructions having a second configuration, and at least one processor. The system also includes non-transitory computer readable media storing instructions that when executed by the processor cause the at least one processor to perform operations including loading a set of configuration files into a validation generation algorithm, the set of configuration files defining the first configuration of infusion pump operational instructions, the second configuration of infusion pump operational instructions, a unit of measure library, a route of administration library, a dosage library, a subject library, and a formulary library. The operations also include generating a first validation infusion pump operational instruction set for the at least one first infusion pump using the first configuration of infusion pump operational instructions for each combination of an entry in the formulary library and an entry from the subject library for each route of administration in the route of administration library that mirrors a route of administration in the formulary at each dose in the dosage library that mirrors a dosage in the formulary and generating a second validation infusion pump operational instruction set for the at least one second infusion pump using the second configuration of infusion pump operational instructions for each combination of an entry in the formulary library and an entry from the subject library for each route of administration in the route of administration library that mirrors a route of administration in the formulary at each dose in the dosage library that mirrors a dosage in the formulary. The first validation infusion pump instructions are pushed to at least one first infusion pump and the second validation infusion pump instructions are pushed to the at least one second pump. The operations monitor the output signals of the at least one first infusion pump during execution of the first set of infusion pump instructions by the at least one first infusion pump and the output signals of the at least one second infusion pump during execution of the second set of infusion pump instructions by the at least one second infusion pump. A validation file is populated with the output signals of the at least one first infusion pump and the at least one second infusion pump.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

BRIEF DESCRIPTION OF THE DRAWINGS

The present systems and methods for learned feature vectors for single and across sensor object tracking are described in detail below with reference to the attached drawing figures, wherein.

DETAILED DESCRIPTION

At a high level, the present disclosure relates to, among other things, methods, systems, and computer-readable media for computationally validating the operation and safety systems of an infusion pump prior to use in human (e.g., patient) care. Infusion pumps are commonly used in care facilities (e.g., hospitals) to deliver infusible material (e.g., medication, fluids, nutrition, and so forth) at a controlled rate. Infusions pumps can be used for infusion of a variety of fluids and medications including, but not limited to anesthesia, chemotherapy, IV drugs, blood transfusions and the like.

After acquisition of an infusion pump the performance of the infusion pump is commonly validated. In other words, the infusion pump is tested to ensure that it operates as expected within the healthcare facilities network and with the data structures used by the electronic medical record system of the healthcare facility. The validation process traditionally includes testing the infusion pump with multiple commands to dispense a specified medication, at a specified rate, to a hypothetical patient. The activity of the infusion pump is observed and any deviations from expected behavior are documented. Corrective action may be taken and the infusion pump may be retested. If no deviations are detected the infusion pump maybe considered validated and deployed for use within the healthcare facility. However, the traditional process may be unable to test each possible combination of infusible materials, at each possible combination of dosages, and at each possible rate. Accordingly, embodiments described herein provide systems, processes, methods, and media that, amongst other things, validate infusion pumps using operational instructions that are generated to include each possible combination of infusible materials, at each possible combination of dosages, at each possible rate for a plurality of synthetic subjects.

Figure 1:
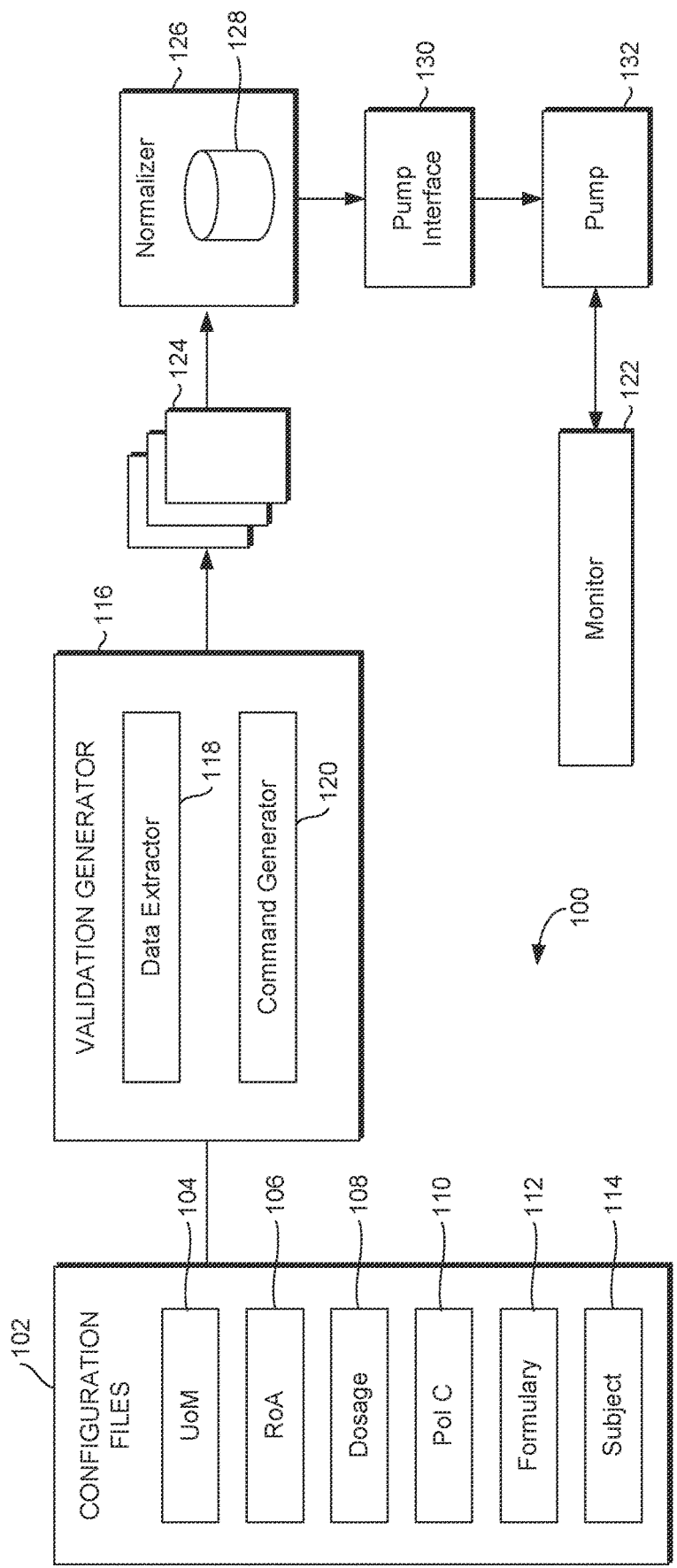
FIG. 1 depicts a process diagram illustrating an example for validation of infusion pump performance based on a set of configuration files, in accordance with some embodiments of the present disclosure.

With initial reference to FIG. 1, a process flow 100 for validation of an infusion pump is depicted, in accordance with some embodiments described herein. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Generally, process flow 100 ingests a set of configuration files, extracts data (e.g., formulary data) from a data repository, and generates infusion pump operational instructions (e.g., computer code configured for execution by an infusion pump) for one or more infusion pumps. The operational instructions are pushed to, and executed by, the infusion pump. Process flow 100 monitors and records the operation of the infusion pump during execution of the operational instructions. In this way, some embodiments of process flow 100 facilitate, at least a portion of, the infusion pumps validation. In this context, infusion pump validation refers to the in situ testing of the infusion pump for actual actions versus expected actions based on the input commands. Advantageously, in at least one embodiment, the infusion pump operational instructions comprise each possible dosage, for each possible infusible material (e.g., medication, nutrient, fluid, and so forth), in each possible combination, for a plurality of synthesized subjects (e.g., synthetically constructed patients, anonymized historical patients, predefined test patients, or any combination thereof).

Some embodiments of process flow 100 are initiated by providing a set of configuration files 102 to a validation generator 116. The set of configuration files 102 may be formatted in any suitable way. For example, the set of configuration files 102 may be character (e.g., tab, comma, semicolon, and so forth) delimited text file (e.g., a .txt, .prn, .odt, .csv file or any similar extension), a spreadsheet file (e.g., .xls, .xlsx, .ods, .numbers file or any similar extension), or any data file format that provides computer recognizable entry differentiation. The configuration files 102 may include a unit of measure (UoM) library 104, a route of administration (RoA) library 106, a dosage library 108, a pump operation information configuration library (POIC) 110, a formulary library 112, a subject library 114, or any combination thereof.

Each library may include configuration data ingestible by the validation generator 116. UoM library 104 identifies each possible unit expression that applies to the infusible materials. For example, a single drug may be associated with unit expressions of "kg", "mg", "mg/kg"; while another drug may be associated with unit expressions of "gm/kg", "gm/$m^2$", "mcg/kg"; yet another drug may be associated with unit expressions of "gm/ml", "ml/kg", "ml/hr"; and so on. The UoM library defines the identity of each possible unit of expression that applies to at least one entry in formulary library 112.

RoA library 106 identifies each possible route of administration that applies to at least one entry in formulary library 112. For example, a single drug included in formulary library 112 may be deliverable via an IV push, an NG tube, or subcutaneous injection, another drug may be deliverable via inter-muscular injection, as an inhalant, or oral ingestion. The RoA library 106 defines the identity of each possible route that an entry in formulary library 112 may be delivered.

Dosage library 108 identifies each possible packaging/dispensable configuration ("dosage") that applies to at least one entry in formulary library 112. For example, a single drug included in formulary library 112 may be dispensed from an ampule, in a syringe, in a vial, in an emulsion, in a powder, in solution, in a syringe, and so forth; a second drug may be dispensed in a bag or as an injectable. Accordingly, the dosage library 108 defines the identity of each possible dosage that applies to at least one entry in formulary library 112.

POIC library 110 identifies the configuration of an infusion pump (e.g., infusion pump 132) that is to be validated.

Generally, the POIC library 110 includes an entry corresponding to an infusion pump of each type and each manufacturer to be validated. In other words, each infusion pump from a first manufacturer of a first model may be represented by a single entry in POIC library 110; each infusion pump from the first manufacturer of a second model may be represented by a second entry POIC library 110; and, each infusion pump from a second manufacturer of a third model may be represented by a third entry POIC library 110. For each entry, the POIC library 110 defines the software and hardware identity of the corresponding one or more infusion pumps to be validated by process flow 100. For example, POIC library 110 may define the structure of executable scripts usable by an infusion pump. The structure definitions may identify pump interface commands (e.g., to establish a secure communication channel between the device executing validation generator 116, to load the infusion pump with an executable operation instruction set, to initiate execution of an operation instruction set, to terminate execution of an operation instruction set, and so forth). The POIC library 110 may also define authentication procedures, syntax rules, and nomenclature rules for the corresponding infusion pump. Additionally, POIC library 110 entries define, at least some of, the hardware properties of the corresponding infusion pump. For example, a first infusion pump may have one rate controlled dispensing mechanism (e.g., a rate controlled syringe pump, an elastomeric pump, a peristaltic pump, and so forth). A second infusion pump may have two or more rate controlled dispensing mechanisms. By defining the software and hardware identity of the one or more infusion pumps to be validated, POIC library 110 facilitates the generation of each possible set of operational instruction set for each infusion pump.

Formulary library 112 defines each infusible material that is available for use by an infusion pump. Generally, the formulary library 112 defines each infusible material by including an entry for each material at each dosage available to the facility that will deploy the infusion pumps awaiting validation. The entries of the formulary library 112 may identify data such as the routes of administration applicable for the entry, the dosage applicable for the entry, the unit(s) of measure applicable for the entry, the active ingredient(s) applicable for the entry, the amount(s) of the active ingredient(s) applicable for the entry, a unique identifier for the entry, and any other relevant data.

Subject library 114 defines demographic data for a plurality of synthesized subjects. In some embodiments, subject library 114 defines the identity of the fields of a data repository that stores historical subject data (i.e., human patients previously treated by the facility). For example, the subject library 114 may define that subject weight data is stored in a field with a field label of x, subject height data is stored in a field with a field label of y, subject age is stored in a field with field label z, subject allergies is stored in fields with label a, gender is stored with field label b, and so on. This embodiment of subject library 114 may facilitate the generation of pseudo randomized synthetically constructed subjects (i.e., a subject generated based on real human patient data but that does not correspond to a real human) and de-identified historical subjects (i.e., anonymized patients previously treated by the facility) for validation of one or more infusion pumps. Additionally, or alternatively, subject library 114 may define the demographic data of predefined test subjects (i.e., predefined synthetically constructed subjects or de-identified historical subjects, or any combination thereof) for validation of one or more infusion pumps.

Process flow 100 includes loading configuration files 102 to validation generator 116. Generally, validation generator 116 ingests and generates a plurality of validation infusion pump operational instruction sets 124 based on the loaded configuration files 102. The validation generator 116 may load the configuration files 102 in any suitable way. Once loaded, one or more of the configuration files 102 may be used by data extractor 118 to extract the data stored in one or more communicatively coupled data repositories (e.g., data repository 202 of FIG. 2). For example, data extractor 118 may access the configuration data in subject library 114 and use the field labels to map the location of demographic data within a communicatively coupled electronic health record (EHR) data repository (e.g., subject database 204 of FIG. 2). Data extractor 118 may submit queries to a system administering the EHR data repository based on the mapped field labels. To facilitate this, some embodiments of data extractor 118 may include executable code suitable for manipulation of structured data. For example, data extractor 118 may be a software component written in Structured Query Language (SQL), PHP, Java, Python, Ruby, Cerner® Command Language (CCL), or any similar language. The result of the queries may be held in a first temporary data structure accessible by command generator 120. The first temporary data structure may maintain the relational associations defined by the EHR data repository in some embodiments.

Additionally, data extractor 118 may extract data from one or more configuration files. For example, data extractor 118 may extract each entry of the UoM library 104, RoA library 106, dosage library 108, POIC library 110, and formulary library 112. The data from each library may be held in an independent temporary data structure accessible by command generator 120. For example, the entries of UoM library 104 may be held in a second temporary data structure, the entries of RoA library 106 may be held in a third temporary data structure, the entries of dosage library 108 may be held in a fourth temporary data structure, the entries of the POIC library 110 may be held in a fifth temporary data structure, and the entries of the formulary library 112 may be held in a sixth temporary data structure.

Validation generator 116 also includes a command generator 120. Generally, command generator 120 computationally generates a plurality of validation infusion pump operational instruction sets for one or more an infusion pumps (e.g., infusion pump 132). The command generator 120 may include one or more a software components written in Structured Query Language (SQL), PHP, Java, Python, Ruby, Cerner® Command Language (CCL), or any similar language. For example, command generator 120 can include a plurality of computational algorithms that ingest data stored in one or more temporary data structures generated by data extractor 118. When executed, each algorithm can perform a series of data manipulations. For example, some embodiments of command generator 120 include an RXmask algorithm. An RXmask algorithm may read the temporary data structures corresponding to the dosage library 108 and formulary library 112. The RXmask algorithm compares dosages defined for each infusible material in the formulary library 112 and the dosages defined in the dosage library 108. Where an entry in the formulary library includes a dosage that is not reflected in the dosage library is detected, an alert may be communicated, via a user interface, to a computing device administering the validation process. Otherwise, RXmask assigns a value for each permutation of the dosage combinations defined for each entry in the formulary library 112. For example, RXmask may assign a drug that is only prescribeable as a diluent a first value, a drug that is available as a diluent or an additive a second value, and a drug that is available as an additive a third value. Each combination of dosages may be represented by a unique value. Accordingly, RX mask may assign a value to each entry of the formulary library 112.

Similarly, some embodiments of command generator 120 include an infusion rate algorithm. An infusion rate algorithm may read the temporary data structures corresponding to the UoM library 104 and formulary library 112. The infusion rate algorithm compares the units of measure defined for each infusible material in the formulary library 112 and the units of measure defined in the UoM library 104. Where an entry in the formulary library includes a unit of measure that is not reflected in the UoM library is detected, an alert may be communicated, via a user interface, to a computing device administering the validation process. Otherwise, infusion rate algorithm calculates an infusion rate for each entry of the formulary library 112 based on the units of measures defined by the UoM library 104 and the output of one or more other algorithms. One skilled in the art will understand that the algorithms described above are merely illustrative of the algorithms that are incorporated in command generator 120. The command generator 120 may also include one or more algorithms that generate each combination of the routes of administration identified in the formulary library 112. In combination, these algorithms are used to generate an validation order for each combination of an entry in the formulary library and an entry from the subject library for each route of administration in the route of administration library that mirrors a route of administration in the formulary at each dose in the dosage library that mirrors a dosage in the formulary library.

Command generator 120 further includes an authoring script that automatically generates a validation infusion pump operational instruction set for each validation order based on the infusion pump configurations defined in the POIC library 110. For example, command generator 120 may store pre-written code segments. Command generator 120 may generate a validation infusion pump operational instruction using a plurality of the pre-written code segments and the configuration data stored in the POIC library 110. Accordingly, command generator 120 may populate fields of the pre-written code segments with data generated by the command generator's algorithmic manipulation of the temporary data structures generated based on the UoM library 104, RoA library 106, dosage library 108, and POIC library 110. Each validation infusion pump operational instruction sets may be output by command generator 120 as an individual file (e.g., validation infusion pump operational instruction sets 124). For example, in at least one embodiment, the command generator 120 outputs an .XML file that includes the operational instructions for an infusion pump for each validation order generated by the validation generator 116. Although not depicted, in some embodiments process flow 100 includes transmitting the validation infusion pump operational instruction, via a pump interface 130, to an infusion pump for execution.

Some embodiments of process flow 100 include normalizing the validation infusion pump operational instruction set files 124. Normalization may be desired in situations where at least one of the configuration files 102 includes an entry, or entries, with non-standardized values. This may occur where, for any number of reasons, a care facility has not adopted or does not use standardized nomenclature. Similarly this may occur where the care facility uses one standard nomenclature and the infusion pump uses a second standard nomenclature. The normalizer 126 ingests the validation infusion pump operational instruction set files 124 and converts the validation infusion pump operational instruction set file 124 into a normalized validation infusion pump operational instruction set file based on a normalization library 128. The normalization library can include encoding, structure, and semantic configuration data for a particular data communication standard. In an embodiment, the normalization library includes the Health Level Seven (HL7) configuration data. Some embodiments of process flow 100 includes transmitting the normalized validation infusion pump operational instructions, via a pump interface 130, to an infusion pump for execution by infusion pump 132.

The pump interface 130 provides communicative connectivity to an infusion pump 132. Pump interface 130 may include hardware, firmware, software, or any combination thereof. For example, pump interface 130 may include an input/output port for connecting a data transmission cable. Pump interface 130 may also include one or more application program interface to facilitate interpretation of infusion pump operational instructions. It may also facilitate bi-directional communication with one or more communicatively coupled devices. While the infusion pump 132 executes each of the validation infusion pump operational instructions a monitor 122 records the signals generated by infusion pump 132. The signals are recorded in a file corresponding with the specific validation infusion pump operational instructions. For example, monitor 122 may capture an initiation signal that indicates that the infusion pump's rate controlled dispensing mechanism has activated at a specific rate. Monitor 122 may also capture signals indicating changes in the rate the rate controlled dispensing mechanism operates, termination of the operation of the rate controlled dispensing mechanism, indication that patient safety alarms were tested and passed, any other signal generated by the infusion pump during execution of the validation infusion pump operational instructions. Monitor 122 may also capture signals indicating triggering of a patient safety alarm and automatic termination of the validation infusion pump operational instructions.

Notably, in at least one embodiment, validation infusion pump operational instruction sets are intentionally generated by process flow 100 that should trigger a patient safety alarm when executed by an infusion pump. These instruction sets may be generated in several ways. For example, some instruction sets are generated including patient demographic data contraindicated for the infusible material identified in the instruction set. Other instruction sets are generated including multiple infusible materials that are contraindicated for infusion at the same time, by the same pump, or at the rate defined in the instruction set. As indicated above, monitor 122 may capture the signals generated during the execution, or attempted execution, of these instruction sets. The record created by monitor 122 may be analyzed to validate that infusion pump 132 is operating correctly. In other words, by generating a validation infusion pump operational instruction for each combination of an entry in the formulary library and an entry from the subject library for each route of administration in the route of administration library that mirrors a route of administration in the formulary at each dose in the dosage library that mirrors a dosage in the formulary library; process flow 100 may validate that an infusion pump 132 operates as intended, analyzes instructions as intended, and triggers a patient safety alarm under appropriate conditions.

Figure 2:
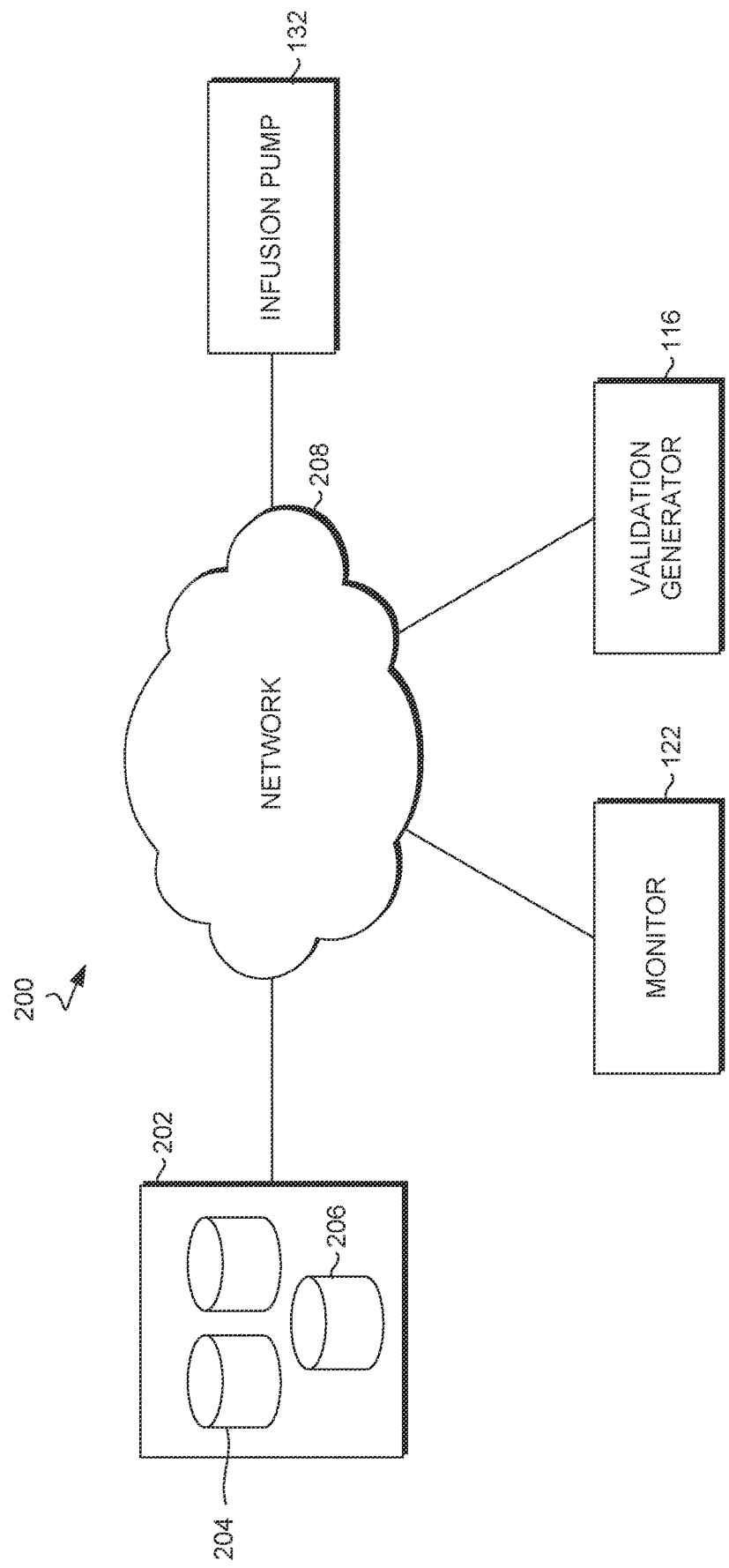
FIG. 2 depicts an example network environment that may facilitate validation of infusion pump performance, in accordance with some embodiments of the present disclosure.

Turning to FIG. 2, a network environment 200 for validation of an infusion pump is depicted, in accordance with aspects described herein. Network environment 200 may facilitate execution of embodiments of process flow 100 of FIG. 1, or method 300 of FIG. 3. Network environment 200 includes, amongst other things, a validation generator 116, an infusion pump 132, and one or more data repositories 202. As depicted, network environment 200 facilitates the communicative coupling of the validation generator 116, infusion pump 132, and the one or more data repositories 202 via a network 208. Network 208 may include, without limitation, local area networks (LANs) and/or wide area networks (WANs) such as described in relation to network 406 of FIG. 4.

Validation generator 116 may include executable code suitable for manipulation of structured data. For example, validation generator 116 may be a software component written in Structured Query Language (SQL), PHP, Java, Python, Ruby, Cerner® Command Language (CCL), or any similar language. In some embodiments, validation generator 116 is instantiated in a cloud environment (e.g., Oracle® Cloud, Amazon® Web Services, Microsoft® Azure, and so forth). In some embodiments, validation generator 116 is instantiated in a computing device (e.g., remote computer 408 of FIG. 4, control server 402 of FIG. 4, or computing device 500 of FIG. 5).

Monitor 122 may include executable code suitable for manipulation of structured data. For example, monitor 122 may be a software component written in Structured Query Language (SQL), PHP, Java, Python, Ruby, Cerner® Command Language (CCL), or any similar language. In some embodiments, monitor 122 is instantiated in a cloud environment (e.g., Oracle® Cloud, Amazon® Web Services, Microsoft® Azure, and so forth). In some embodiments, Monitor 122 is instantiated in a computing device (e.g., remote computer 408 of FIG. 4, control server 402 of FIG. 4, or computing device 500 of FIG. 5).

Infusion pump 132 generally includes a processor, computer readable storage media, and at least rate controlled dispensing mechanism. The processor, computer readable storage media, and the at least rate controlled dispensing mechanism are configured to infuse fluids, medications and/or nutrients into the circulatory system of an individual subject or patient. The infusions may be, but are not limited to, intravenous, arterial, epidural and the like. Infusion pumps can administer injections continuously, intermittently, or upon patient request. Infusions pumps can be used for infusion of a variety of fluids and medications including, but not limited to anesthesia, chemotherapy, IV drugs, blood transfusions and the like. Infusion may be facilitated by manipulation of the rate controlled dispensing mechanism. For example, some embodiments of infusion pump 132 include at least one syringe pump where infusible fluid is held in the reservoir of a syringe and a moveable piston controls rate controlled fluid delivery based on signals transmitted by the processor. Some embodiments of infusion pump 132 include at least one elastomeric pump based rate controlled dispensing mechanism where fluid is held in a stretchable balloon reservoir and signals transmitted by the processor adjust pressure from the elastic walls of the balloon to drive rate controlled fluid delivery. Some embodiments of infusion pump 132 include at least one peristaltic pump based rate controlled dispensing mechanism where a set of rollers pinches down on a length of flexible tubing, pushing fluid forward at a controlled rate. Infusion pump 132 may also include one or more components of computing device 500 described in reference to FIG. 5.

Additionally, infusion pump 132 includes a patient safety alarm system. The patient safety alarm system includes a plurality of rules that define conditions in which the infusion pump should not dispense the infusible materials connected to the rate controlled dispensing mechanism. These rules may be held in computer storage media communicatively coupled to the processor. These rules may be checked against the infusion pump operational instructions that are pushed to the infusion pump. The infusion pump operational instructions may include, amongst other things, patient demographics (e.g., height, weight, age, gender, allergies, and so forth) corresponding to the patient receiving the dispensed infusible material. Further, the infusion pump operational instructions may include the identity of the infusible material (e.g., the name of the material or the name of the individual components of the material), the rate at which the infusible material is to be dispensed, and the duration of the infusion. Upon verification that the operational instructions do not violate a patient safety rule, the infusion pump initiates dispensation of the infusible material. Where the operational instructions include at least one violation of a patient safety rule, the infusion pump should generate an alarm condition and prevent initiation of the instructions (i.e., should not dispense the infusible material).

Data repository 202 generally stores information including data, computer instructions (e.g., software program instructions, routines, or services), or models used in embodiments of the described technologies. Data repository 202 includes one or more relational database in some embodiments. Although depicted as including multiple database components, data repository 202 may be embodied as one or more data stores or may be in the cloud. Data repository 202 may maintain a historical subject database 204. The database of historical subjects 204 may be populated with data associated with patients of a care facility. For example, historical subject database may include demographic data, diagnosis data, treatment data, medication data, and any other patient related data. Data repository 202 may also maintain a formulary database 206. The formulary database 206 may include the dosage, routes of administration, unit of measure, identity, and constituent components of every infusible material available for use by the care facility.

Figure 3:
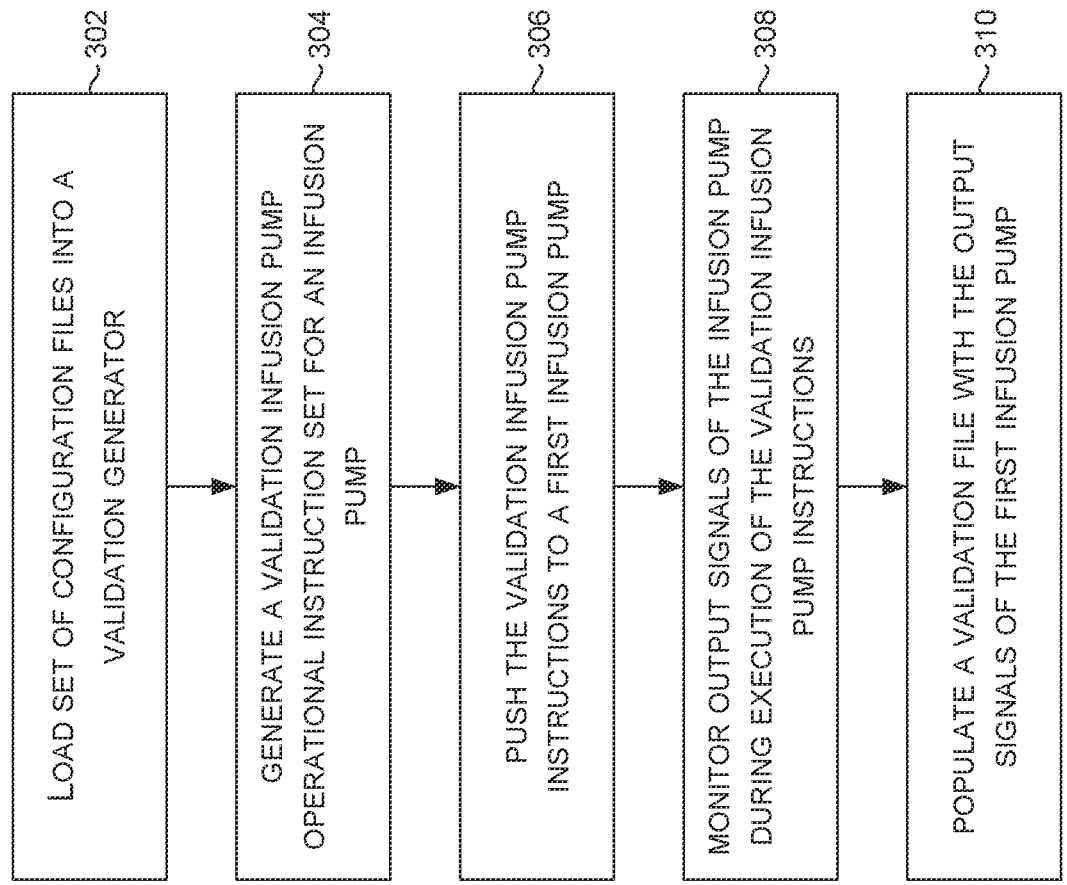
FIG. 3 depicts an example method for validation of infusion pump performance, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, the method 300 is described, by way of example, with respect to the process flow 100 of FIG. 1. However, this method may additionally or alternatively be executed by any one system, or any combination of systems, including, but not limited to, those described herein.

FIG. 3 depicts a method 300 for validation of an infusion pump, in accordance with aspects described herein. Some embodiments of method 300 begin at block 302. Block 302 includes loading a set of configuration files into a validation generation algorithm. The set of configuration files define an infusion pump operational instruction configuration, unit of measure library, route of administration library, dosage library, subject library, and formulary libraries. For example, a validation generator 116 may receive or otherwise access a set of configuration files.

The method 300, at block 304, includes generating a validation infusion pump operational instruction set for an infusion pump corresponding to the infusion pump operational instruction configuration for each combination of an entry in the formulary library and an entry from the subject library for each route of administration in the route of administration library that mirrors a route of administration in the formulary at each dose in the dosage library that mirrors a dosage in the formulary. For example, the validation generator 116 may generate one or more validation infusion pump operational instruction sets 124 based on the a unit of measure (UoM) library 104, a RoA library 106, a dosage library 108, a POIC library 110, a formulary library 112, a subject library 114, or any combination thereof.

The method 300, at block 306, includes pushing the validation infusion pump instructions to a first infusion pump that corresponds to a first entry in the one or more infusion pump operational instruction libraries, the first set of infusion pump instructions including each of the plurality of infusion pump operational instructions generated using the infusion pump operational instruction configuration associated with the first infusion pump. For example, validation generator 116 may communicate the infusion pump operational instructions to infusion pump 132.

The method 300, at block 308, includes monitoring output signals of the first infusion pump during execution of the first set of infusion pump instructions by the first infusion pump. For example, a monitor 122 may monitor the signals output by infusion pump 132 during execution of each infusion pump instruction set 124. The method 300, at block 310, includes populating a validation file with the output signals of the first infusion pump. For example, monitor 122 may write data corresponding the output signals of infusion pump 132 during execution of each infusion pump instruction set 124.

Figure 4:
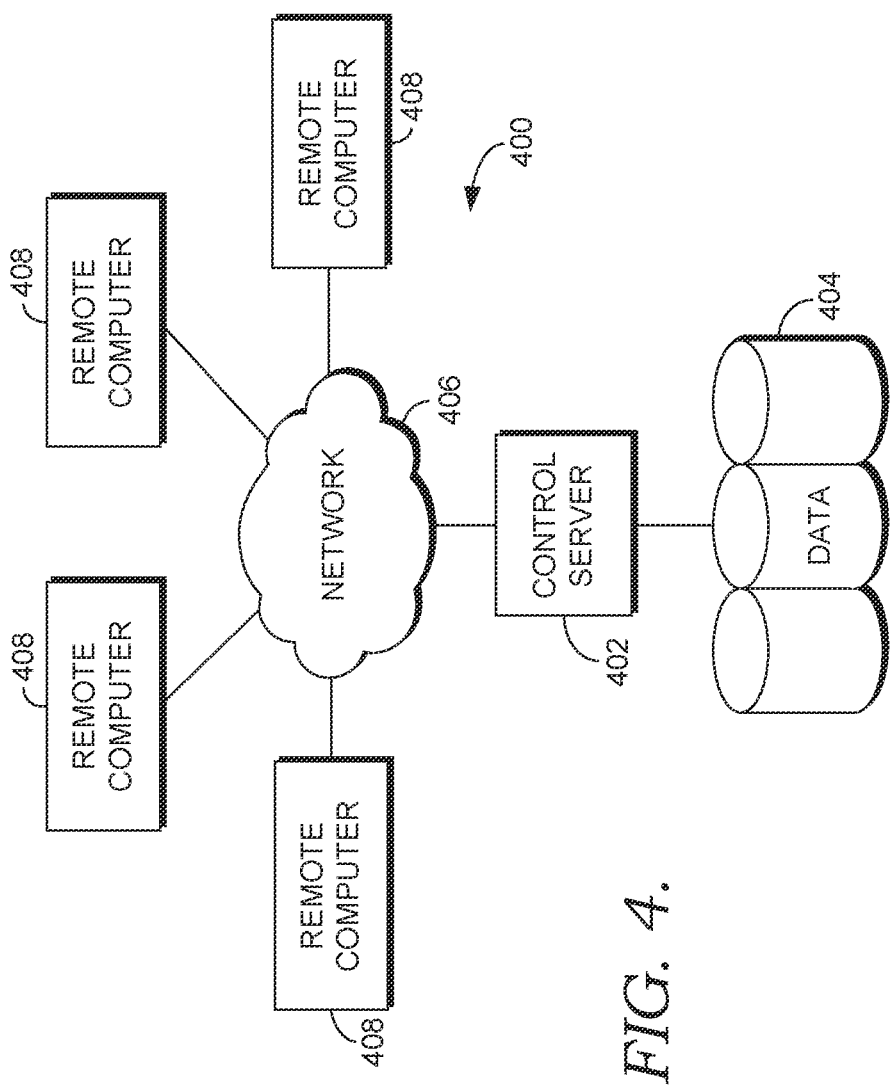
FIG. 4 depicts an example system environment that may facilitate validation of infusion pump performance, in accordance with some embodiments of the present disclosure.

Referring now to FIG. 4, FIG. 4 depicts an illustrative computing system environment, for instance, a medical information computing system, on which embodiments of the present invention may be implemented is illustrated and designated generally as reference numeral 400. It will be understood and appreciated by those of ordinary skill in the art that the illustrated medical information computing system environment 400 is merely an example of one suitable computing environment and is not intended to suggest any limitation as to the scope of use or functionality of the invention. Neither should the medical information computing system environment 400 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 4, the exemplary medical information computing system environment 400 includes a general purpose computing device in the form of a server 402. Components of the server 402 may include, without limitation, a processing unit, internal system memory, and a suitable system bus for coupling various system components, including database cluster 404, with the server 402. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 402 typically includes, or has access to, a variety of computer readable media, for instance, database cluster 404. Computer readable media can be any available media that may be accessed by server 402, and includes volatile and nonvolatile media, as well as removable and non-removable media. By way of example, and not limitation, computer readable media may include computer storage media and communication media. Computer storage media may include, without limitation, volatile and nonvolatile media, as well as removable and non-removable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 402. Computer storage media does not comprise signals per se. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 4, including database cluster 404, provide storage of computer readable instructions, data structures, program modules, and other data for the server 402.

The server 402 may operate in a computer network 406 using logical connections to one or more remote computers 408. Remote computers 408 may be located at a variety of locations in a medical or research environment, for example, but not limited to, clinical laboratories, hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, students, office assistants and the like. The remote computers 408 may also be physically located in non-traditional medical care environments so that the entire health care community may be capable of integration on the network. The remote computers 408 may be personal computers, servers, routers, network PCs, peer devices, other common network nodes, or the like, and may include some or all of the components described above in relation to the server 402. The devices can be personal digital assistants or other like devices.

Exemplary computer networks 406 may include, without limitation, local area networks (LANs) and/or wide area networks (WANs). Such networking environments are commonplace in offices, enterprise-wide computer networks, intranets, and the Internet. When utilized in a WAN networking environment, the server 402 may include a modem or other means for establishing communications over the WAN, such as the Internet. In a networked environment, program modules or portions thereof may be stored in the server 402, in the database cluster 404, or on any of the remote computers 408. For example, and not by way of limitation, various application programs may reside on the memory associated with any one or more of the remote computers 408. It will be appreciated by those of ordinary skill in the art that the network connections shown are exemplary and other means of establishing a communications link between the computers (e.g., server 402 and remote computers 408) may be utilized.

In operation, a user may enter commands and information into the server 402 or convey the commands and information to the server 402 via one or more of the remote computers 408 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 402. In addition to a monitor, the server 402 and/or remote computers 408 may include other peripheral output devices, such as speakers and a printer.

Although many other internal components of the server 402 and the remote computers 408 are not shown, those of ordinary skill in the art will appreciate that such components and their interconnection are well known. Accordingly, additional details concerning the internal construction of the server 402 and the remote computers 408 are not further disclosed herein.

Figure 5:
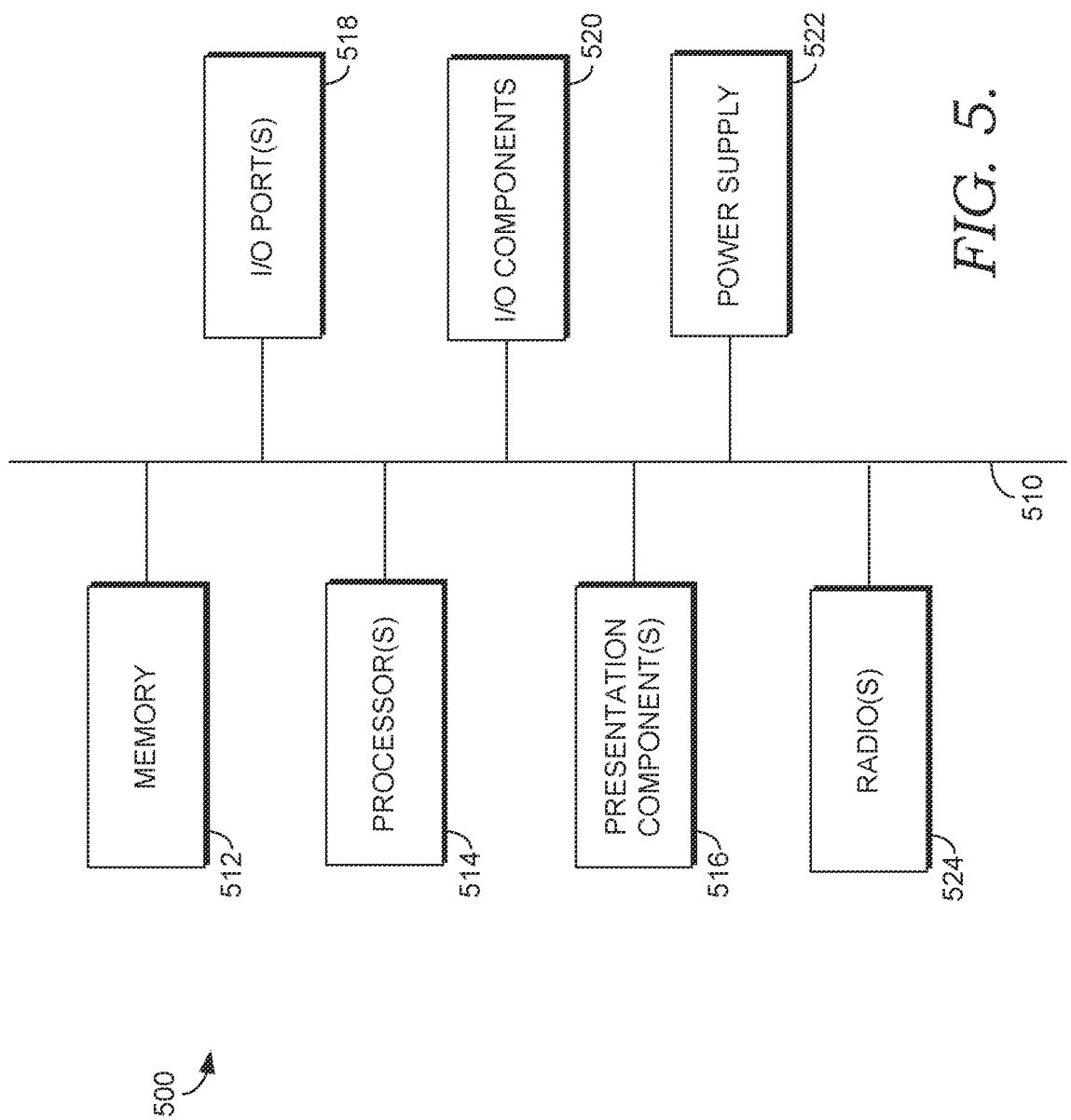
FIG. 5 is a block diagram of an example computing device suitable for use in implementing some embodiments of the present disclosure.

Referring now to FIG. 5, FIG. 5 depicts a computing device 500. Computing device 500 includes bus 510 that directly or indirectly couples the following devices: memory 512, one or more processors 514, one or more presentation components 516, input/output (I/O) ports 518, I/O components 520, and power supply 522. Bus 510 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media as described above and communication media.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512 or I/O components 520. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built in computing device 500. Illustrative I/O components 520 include a microphone, camera, joystick, game pad, satellite dish, scanner, printer, wireless device, etc.

Radio 524 represents a radio that facilitates communication with a wireless telecommunications network. In aspects, the radio 524 utilizes one or more transmitters, receivers, and antennas to communicate with the wireless telecommunications network on a first downlink/uplink channel. Though only one radio is depicted in FIG. 5, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 524 might additionally or alternatively facilitate other types of wireless communications including Wi-Fi, WiMAX, LTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

As can be understood, embodiments of the present invention provide techniques for improving searches. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

We claim:

1. A method for infusion pump validation, the method comprising:
   loading a set of configuration files into a validation generation algorithm, the set of configuration files defining an infusion pump operational instruction configuration, unit of measure library, route of administration library, dosage library, subject library, and formulary library;
   generating a validation infusion pump operational instruction set for an infusion pump corresponding to the infusion pump operational instruction configuration for each combination of an entry in the formulary library and an entry from the subject library for each route of administration in the route of administration library that mirrors a route of administration in the formulary library at each dose in the formulary library that mirrors a dosage in the dosage library;
   pushing a subset of validation infusion pump instructions to a first infusion pump, the subset of validation infusion pump instructions including each of the validation infusion pump operational instruction set generated using the infusion pump operational instruction configuration associated with the first infusion pump;
   monitoring output signals of the first infusion pump during execution of the subset of validation infusion pump instructions by the first infusion pump; and
   populating a validation file with output signals of the first infusion pump.

2. The method of claim 1, further comprising executing the subset of validation infusion pump instructions.

3. The method of claim 2, wherein executing the subset of validation infusion pump instructions causes the first infusion pump to activate a rate controlled mechanism.

4. The method of claim 1, wherein the subset of validation infusion pump instructions includes at least one instruction set that includes a contraindicated delivery of medication to a subject.

5. The method of claim 4, wherein in response to the at least one instruction set, outputting by the first infusion pump a subject safety signal.

6. The method of claim 1, wherein the set of configuration files further define another infusion pump operational instruction configuration, and wherein the method further comprises:
   pushing another validation infusion pump operational instruction set to a second infusion pump; and
   populating the validation file with the output signals of the second infusion pump.

7. The method of claim 1, further comprising:
   normalizing the subset of validation infusion pump instructions using a standard nomenclature library.

8. The method of claim 7, wherein each validation infusion pump instruction set is output as an extensible markup language file, and wherein normalizing the validation infusion pump instructions includes replacing content elements of the extensible markup language file with corresponding content elements defined by the standard nomenclature library.

9. Non-transitory computer readable storage media storing instructions that when executed by at least one processor cause the at least one processor to perform operations comprising:
   loading a set of configuration files into a validation generation algorithm, the set of configuration files defining an infusion pump operational instruction configuration, unit of measure library, route of administration library, dosage library, subject library, and formulary library;
   generating a validation infusion pump operational instruction set for an infusion pump corresponding to the infusion pump operational instruction configuration for each combination of an entry in the formulary library and an entry from the subject library for each route of administration in the route of administration library that mirrors a route of administration in the formulary library at each dose in the dosage library that mirrors a dosage in the formulary library;
   pushing validation infusion pump instructions to a first infusion pump that corresponds to a first entry in one or more infusion pump operational instruction libraries;
   monitoring output signals of the first infusion pump during execution of the validation infusion pump instructions by the first infusion pump; and
   populating a validation file with the output signals of the first infusion pump.

10. The non-transitory computer readable storage media of claim 9, further comprising:
    executing the validation infusion pump instructions.

11. The non-transitory computer readable storage media of claim 10, wherein executing the validation infusion pump instructions causes the first infusion pump to activate a rate controlled mechanism.

12. The non-transitory computer readable storage media of claim 9, wherein the validation infusion pump operational instruction set includes at least one instruction set that includes a contraindicated delivery of medication to a subject.

13. The non-transitory computer readable storage media of claim 12, wherein in response to the at least one instruction set, the first infusion pump output includes a subject safety signal.

14. The non-transitory computer readable storage media of claim 9, wherein the set of configuration files further defines another infusion pump operational instruction configuration, and wherein the operations further comprise:
generating a second validation infusion pump operational instruction set for a second infusion pump;
pushing the other validation infusion pump operational instruction set to the second infusion pump; and
populating the validation file with the output signals of the second infusion pump.

15. The non-transitory computer readable storage media of claim 9, further comprising:
normalizing the validation infusion pump instructions using a standard nomenclature library.

16. The non-transitory computer readable storage media of claim 15, wherein each validation infusion pump instruction set is output by the validation generation algorithm as an extensible markup language file.

17. A system for infusion pump validation, the system comprising:
at least one first infusion pump with operational instructions having a first configuration;
at least one second infusion pump with operational instructions having a second configuration;
at least one processor;
non-transitory computer readable media storing instructions that when executed by the at least one processor cause the at least one processor to perform operations including:
loading a set of configuration files into a validation generation algorithm, the set of configuration files defining a first configuration of infusion pump operational instructions, a second configuration of infusion pump operational instructions, a unit of measure library, a route of administration library, a dosage library, a subject library, and a formulary library;
generating a first validation infusion pump operational instruction set for the at least one first infusion pump using the first configuration of infusion pump operational instructions for each combination of an entry in the formulary library and an entry from the subject library for each route of administration in the route of administration library that mirrors a route of administration in the formulary library at each dose in the formulary library that mirrors a dosage in the dosage library;
generating a second validation infusion pump operational instruction set for the at least one second infusion pump using the second configuration of infusion pump operational instructions for each combination of an entry in the formulary library and an entry from the subject library for each route of administration in the route of administration library that mirrors a route of administration in the formulary at each dose in the dosage library that mirrors a dosage in the formulary;
pushing the first validation infusion pump operational instruction set to the at least one first infusion pump and the second validation infusion pump operational instruction set to the at least one second infusion pump;
monitoring output signals of the at least one first infusion pump during execution of a first set of infusion pump instructions by the at least one first infusion pump;
monitoring output signals of the at least one second infusion pump during execution of the second validation infusion pump operational instruction set by the at least one second infusion pump; and
populating a validation file with the output signals of the at least one first infusion pump and the at least one second infusion pump.

18. The system of claim 17, wherein the first validation infusion pump instructions include at least one instruction set that includes a contraindicated delivery of medication to a subject.

19. The system of claim 18, wherein in response to the at least one instruction set, the output signals include a subject safety signal.

20. The system of claim 17, wherein executing the first validation infusion pump instructions causes the at least one first infusion pump to activate a rate controlled mechanism.

* * * * *